Aug. 8, 1939.   J. PETERSON   2,168,882
TWO-WAY PLOW
Filed Sept. 16, 1936   3 Sheets-Sheet 1

INVENTOR
Julius Peterson.
BY
ATTORNEYS.

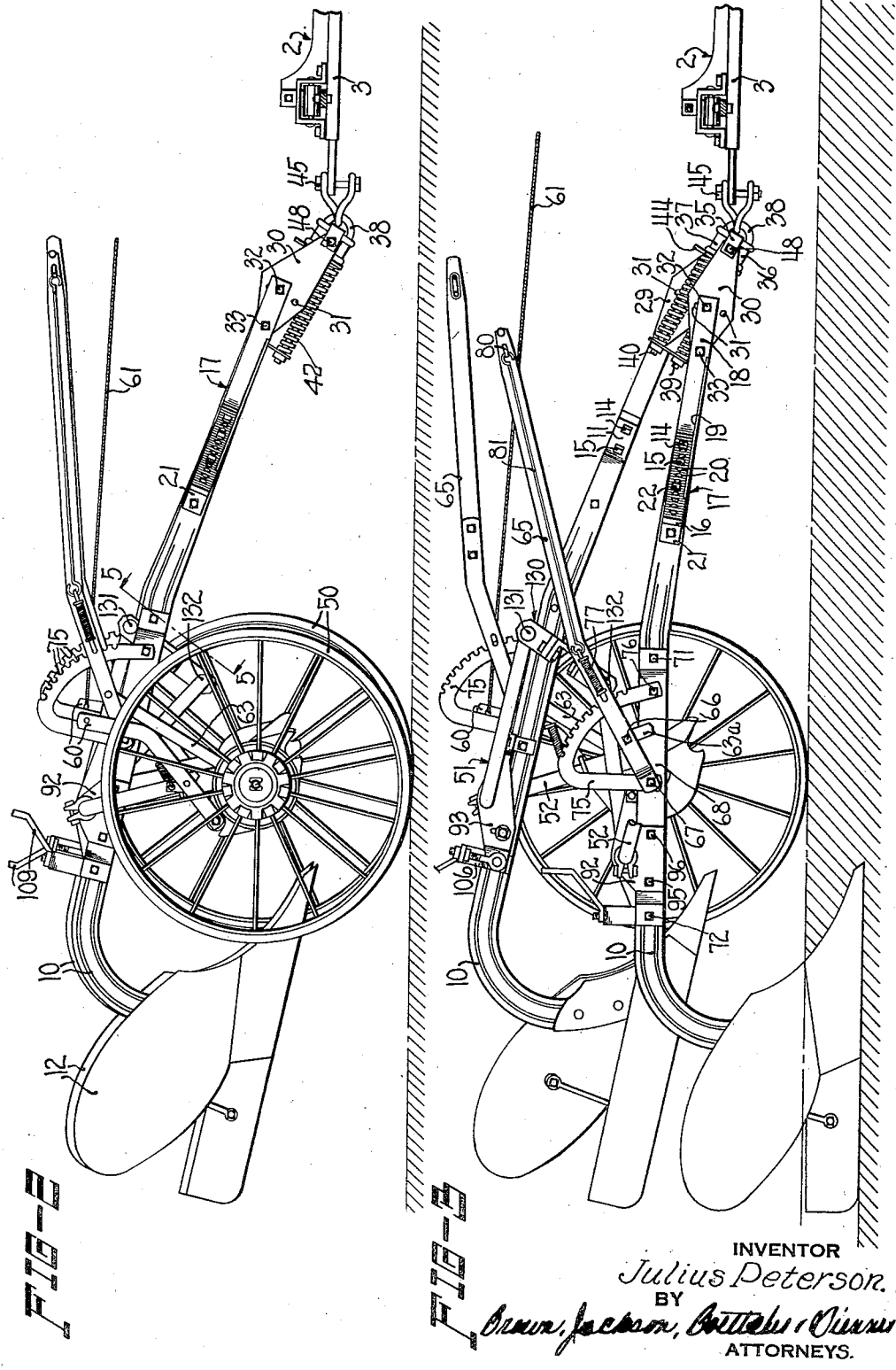

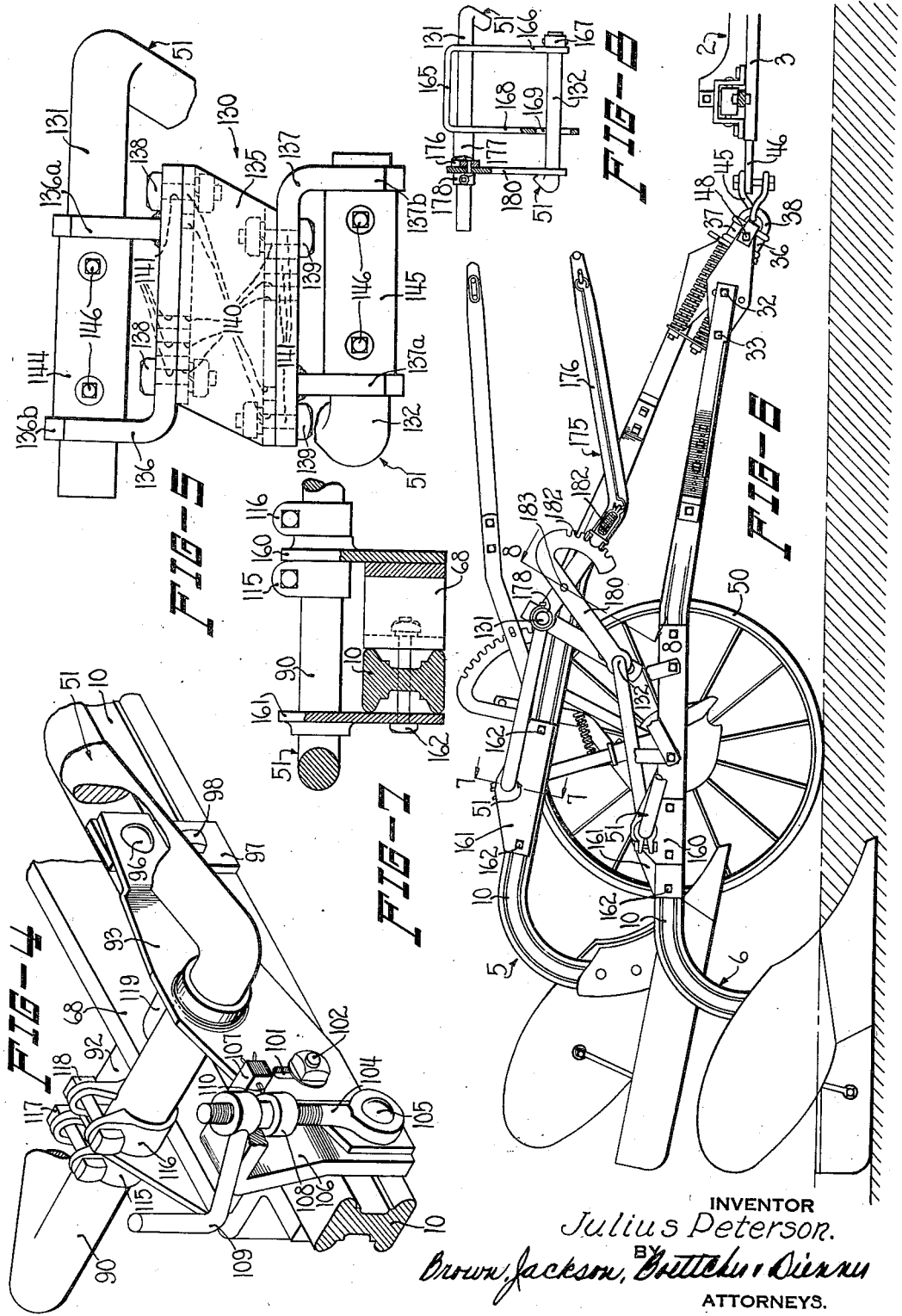

Patented Aug. 8, 1939

2,168,882

UNITED STATES PATENT OFFICE 2,168,882

TWO-WAY PLOW

Julius Peterson, Moline, Ill., assignor to Deere & Company, Moline, Ill., a corporation of Illinois Application September 16, 1936, Serial No. 101,018

33 Claims. (Cl. 97—72)

The present invention relates generally to agricultural implements, and is more particularly concerned with two-way plows and similar agricultural machines having two oppositely disposed units that are alternately placed in operation.

One of the principal objects of the present invention is the provision of an agricultural machine embodying two independently movable units so connected together that each unit serves to keep the other unit from tilting laterally while, at the same time, accommodating their independent relative movement. More particularly, it is an object of the present invention to provide two units, each having a supporting wheel or other ground engaging supporting element and so connected together by a stabilizing connection that independent relative movement vertically between the units is accommodated, yet each unit is held rigidly against lateral tilting. By virtue of this particular arrangement, the machine is extremely simple and flexible in its adjustments, yet is strong and sturdy.

Another object of the present invention is the provision of a two-way plow or similar agricultural machine which embodies two units movable vertically independently of one another and each provided with a ground engaging supporting wheel journaled on a swingable crank axle which can be raised and lowered to determine the position of that unit, in connection with a stabilizing connection between the laterally inner portions of the crank axles and so associated therewith that either or both units may be raised or lowered, as desired, yet both units are prevented from tilting laterally.

Another object of the present invention is the provision of a frame-less two-way plow that embodies two oppositely disposed plowing units, each with its own laterally outwardly disposed ground engaging wheel and so connected by a higed stabilizing member that a portion of the weight of each unit is supported on the other unit.

Another object of the present invention is the provision of new and improved means for leveling each unit, and in this connection it is still another object of the present invention to embody the leveling means in the stabilizing connection between the units so that with one adjustment both of the units are arranged in the proper position.

A further object of the present invention is the provision of a new and improved two-way plow that is particularly adapted for tractor operation. When plowing with a wheeled tractor, it is essential that the rear wheel of the tractor be run in the furrow made on the previous round. This fixes the distance that the plow bottom must operate with respect to the adjacent rear wheel of the tractor. Since in a two-way plow pulled by a tractor, first one rear wheel of the tractor runs in the furrow and then the other, for any given tread spacing the distance from the center of the drawbar of the tractor to the furrow is fixed, and this, of course, requires a given spacing laterally from the point of hitch of the plow to the furrow opener in operation. If a two-way plow is to be drawn by a tractor the rear wheels of which are a fixed distance apart, it is necessary that the plow be designed for that particular tractor, and it will not be suitable for use with a tractor having a different spacing of rear wheels. Many farm tractors at the present time are built with adjustable rear wheels, and where the rear wheels can be adjusted it is a relatively simple matter to adjust the tread spacing to accommodate a particular two-way plow. However, the tractor operator may have his tractor wheels set to a particular row spacing that he has adopted, and if he does not need to change them to accommodate his two-way plow, he would never need to change them. Therefore it is one object of the present invention to provide a two-way plow in which the plowing units may be adjusted laterally simply and conveniently so as to accommodate any kind of tractor with any wheel spacing.

These and other objects and advantages of the present invention will be apparent to those skilled in the art after a consideration of the following detailed description, taken in conjunction with the accompanying drawings illustrating such a construction.

In the drawings:

Figure 2 is a side view of the plow shown in Figure 1, but with both plow bottoms raised into their transport position;

Figure 3 is a view similar to Figure 2, but with the right hand plow bottom lowered into an operating or furrow opening position, the position shown in Figure 1;

Figure 4 is an enlarged fragmentary perspective view showing the rocking or journal support of the left hand tool beam on the crank axle for that unit, and illustrating in particular one means for leveling the plow bottom fixed to the rear end of the tool beam;

Figure 5 is an enlarged view, taken on the line 5—5 of Figure 2, showing the details of the stabilizing connection between the two units;

Figure 6 is a view similar to Figure 3, showing a plow having a modified form of stabilizing connection between the two plowing units;

Figure 7 is an enlarged section taken along the line 7—7 of Figure 6; and

Figure 8 is a section taken along the line 8—8 of Figure 6.

Figure 1:
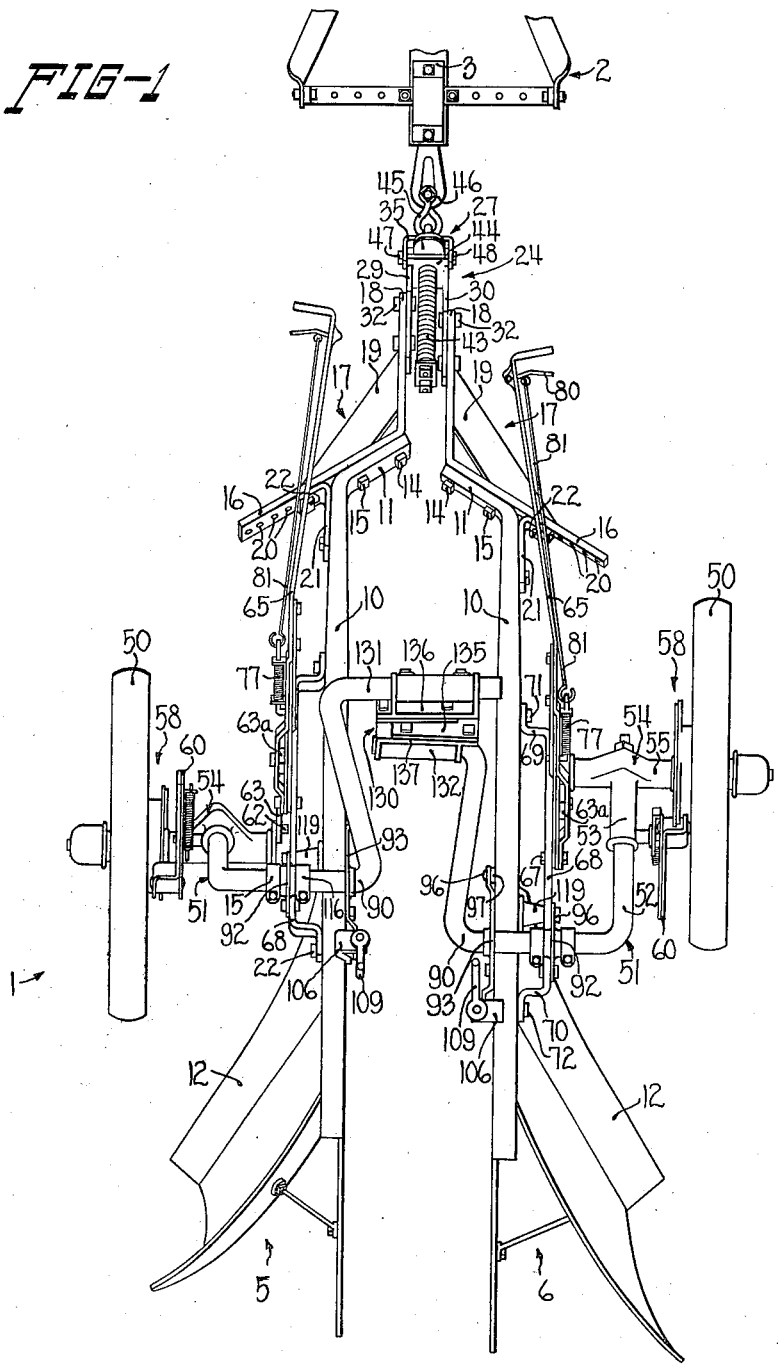
Figure 1 is a plan view of a two-way plow of the tractor propelled type and which embodies the principles of the present invention.

Referring now to the drawings, and particularly Figures 1 to 5, inclusive, the two-way plow embodying the features of the present invention is indicated in its entirety by the reference numeral 1 and is of the trailing type adapted to be propelled by a tractor or other source of draft which is represented by the reference numeral 2 and which includes a more or less conventional drawbar 3. As is best indicated in Figure 1, the plow 1 is of the frameless type and comprises two plowing units 5 and 6. Since each unit is a duplicate of the other, except that one is a right hand unit and the other a left hand unit, only one of the units will be described in detail. Each of the two units making up the plow 1 comprises a beam 10 which has its forward end bent laterally inwardly, as at 11 (Figure 1), and which at its rear end carries a plow body 12. The laterally inwardly bent end 11 is provided with two holes to receive bolts 14 and 15 by which the end 11 is fixed to the laterally outwardly and rearwardly bent end 16 of a hitch member 17. The latter includes a forwardly disposed end 18 connected by a reenforcing bar 19 to the end 16, and the latter end is provided with a plurality of holes 20. A brace 21 is fixed to the forward end of the beam 19 and is adapted to be fastened to the end 16 of the hitch member 17 by a bolt 22 or the like. By having the plurality of bolt holes 20, the beam 10 may be fixed in a number of different lateral positions relative to the associated hitch member 17. The purpose of angling the hitch members 17 rearwardly is to provide sufficient clearance so that the plow will not strike the rear wheels of the tractor when making sharp turns.

The hitch connection, which is indicated in its entirety by the reference numeral 24, includes not only the hitch members 17 described above, but also a pair of plates 29 and 30 which are adjustably fastened, respectively, to the forward ends of the hitch bars 18 of the two units. As best indicated in Figures 2 and 3, each of the hitch plates 29 and 30 is provided with a plurality of holes 31 to receive a bolt 32 at the forward end of each of the hitch bars 18. Another bolt 33 is disposed in apertures in the plate 30 and bar 18, and by removing the bolt 32 and pivoting the hitch member 17 about the bolt 33 relative to the plate 30, the position of the latter relative to the tool beam 10 can be adjusted. The forwardmost ends of the hitch plates 29 and 30 are bolted or otherwise secured to a casting 35 having apertured sleeve sections 36 and 37 through which a U-bolt 38 extends. The ends 39 and 40 of the U-bolt 38 receive hitch springs 42 and 43, and the forward ends of the latter bear against the plate 44 which is disposed between the hitch plates 29 and 30. The U-bolt 38 is pivotally connected in any suitable manner, by a clevis 45, to the rear end 46 of the tractor drawbar 3 for lateral swinging movement.

The two hitch plates 29 and 30 are fastened by pivot bolts 47 and 48, respectively, to the casting 35 for independent vertical swinging movement relative to one another and to the hitch connection 24 about the axes defined by the bolts 47 and 48. By virtue of the springs 42 and 43, the hitch connection between the tractor 2 and the forward ends of the plowing units is made yielding.

Each plowing unit 5 and 6 is provided with a supporting wheel 50 which is mounted on a crank axle 51 which includes an axle portion 52 that extends into and is rigidly fixed in the tubular sleeve portion 53 of a casting 54. The latter is provided with a relatively long laterally extending sleeve portion 55 receiving a stub axle on which the wheel 50 is journaled. A conventional half revolution clutch 58 is provided for each plowing unit, and one part of each clutch is fixed to the stub axle mentioned above and the other part of the half revolution clutch 58 is fixed to the wheel 50, as in conventional practice. The clutch 58 is controlled by means of a trip lever 60, which can be actuated from the operator's position on the tractor by a cable or rod 61, and when the clutch is tripped the two parts of the half revolution clutch are connected together, whereupon the stub axle is rotated by the rotation of the wheel 50.

The stub axle is provided on its inner end with a crank 62 (Figure 1) to which a lifting link 63 is connected at its lower end. The upper end 63a of the lifting link is pivoted, as at 66, to a depth adjusting lever 65, and the depth adjusting lever 65 is pivotally mounted at 67 on a bracket 68 which extends longitudinally of the associated tool beam for a considerable distance and has laterally and inwardly bent ends 69 and 70 bolted, as at 71 and 72, to the beam 10. A latch sector 75 is bolted at 67 and 76 to the bracket 68 and has a notched portion cooperating with a detent mechanism 77 carried on the depth adjusting lever 65 and controlled by a hand grip 80 through a link 81.

The intermediate or journal portion 90 of the crank axle 51 is supported in bearing openings in a pair of laterally spaced plates 92 and 93, best shown in Figure 4. The plate 92 is bolted, as at 95 and 96 (Figure 3), to the laterally outer face of the bracket 68, and the other bearing plate 93 is pivoted, as at 96, to the upper end of a strap 97 (Figures 1 and 4) which is fastened by a bolt 98 to one side of the tool beam 10. The opposite end of the bearing bracket 93 is slotted, as at 101, to receive a bolt 102 that passes through the tool beam 10. This end of the bearing bracket 93 also carries an eye-bolt 104 pivoted thereto, as at 105, and having an upwardly disposed threaded end. A bracket 106 is fixed in any suitable manner to one side of the tool beam 10, preferably but not necessarily by the same bolt 22 that fastens the rear end of the associated bracket 68 to the tool beam, and the upper end of the bracket 106 is bent laterally outwardly and then laterally inwardly, and is slotted, as at 107, to receive the grooved hub 108 of a crank screw 109 which is threaded onto the upper end of the eye-bolt 104. The crank screw is held in proper position in the slot 107 of the bracket 106 by means of a cotter pin 110. By turning the crank screw 109 in one direction or the other, the rear end of the bearing plate 93 may be raised and lowered relative to the other plate, and thus serves to level the tool beam 10 and furrow opener 12 fastened thereto. The crank portion 90 of the crank axle 51 is held against lateral displacement in the bearing plates 92 and 93 by means of two collars 115 and 116 disposed about the journal portion 90 of the crank axle 51 on opposite sides of the bearing plate 92 and securely clamped to the crank axle by means of a pair of clamping bolts 117 and 118. Spacers 119 are disposed about the bolt 96, which fastens the forward end of the bearing plate 92, and are disposed between the brackets 68 and the outer face of the plow beams 10, as best shown in Figure 1.

The two plowing units 5 and 6 are connected together so that each will support, at least in part, and hold the other in proper position by means of a stabilizing connection indicated in its entirety by the reference numeral 130 and best shown in Figure 5. As indicated in Figure 1, each of the crank axles 51 includes a forwardly and laterally inwardly bent crank portion, the crank portion of the left hand crank axle 51 being indicated at 131 and the crank portion for the right hand crank axle 51 being indicated at 132. The stabilizing connection or coupling comprises a channel member 135 to which U-shaped brackets 136 and 137 are secured, as by bolts 138, 138 and 139, 139. Preferably, but not necessarily, one leg 136a is welded to the main portion of the bracket 136, and similarly one leg 137a of the lower U-shaped member is welded to the main portion thereof. A number of bolt holes 140 and 141 are provided so that the brackets 136 and 137 can be shifted to different lateral positions with respect to the channel member 135. The arms 136a, 136b and 137a, 137b are provided with bearing openings in which the laterally inwardly extending portions 131 and 132 of the two crank axles 51 are journaled, and the stabilizing coupling 130 is fixed against lateral displacement with respect to the plowing units by means of a pair of spacing sleeves 144 and 145 that are fixed, as by bolts 146, between the arms of the brackets 136 and 137. If desired, a plurality of holes may be provided in the portions 131 and 132 of the crank axles 51 to receive the bolts 146 in various positions, thereby providing for additional lateral adjustment of the stabilizing connection 130 which may either supplant or augment the above mentioned adjustments had by virtue of the holes 140 and 141.

In Figure 2 the plow is shown in transport position, with both plowing units in a raised position. To dispose the right hand unit in a plowing position, it is merely necessary to trip the power lift clutch 58 of that unit; thereupon it will drop to the ground and, upon forward movement, assume a plowing position corresponding to the depth at which the depth adjusting lever 65 is set. If the plow does not run level when it assumes its full depth of operation after being tripped as just described, the plow may be brought to a level position by turning the crank screw 109. As a rule, however, it is not necessary to change this adjustment unless the adjusting lever 65 has been changed, as when the operator decides to plow at an appreciably different depth than previously. When the end of the field is reached, or it is desired for other reasons to bring the plow back to transport position, it is merely necessary to again trip the clutch 58 of the unit that is in operation, and then the forward travel of the machine will crank the axle 51 downwardly and will raise the unit back into its transport position. If it is now desired to plow with the other unit, the same procedure is followed as above described; that is, the power lift clutch 58 of that unit is tripped so as to lower the plow bottom of that unit into its operating position and making any leveling adjustment that may be desired. During such relative vertical movement of the units 5 and 6, the stabilizing connection 130 acts at all times to maintain the units, whether in operation or in transport position, against lateral tipping while, by virtue of its pivotal connection with the units through the laterally inwardly extending ends of the crank axles, the relative movement between the two units is accommodated. It is to be noted that the stabilizing connection 130 is in the nature of a hinged or pivotal connection wherein the stabilizing coupling is constrained against all movement relative to the units except that permitted by virtue of the pivotal or hinged connection with the inner ends of the crank axles.

Figures 6, 7 and 8 illustrate a somewhat simplified form of stabilizing coupling or connection, one particular advantage of which is that one simple adjustment suffices for leveling both of the plowing units; that is, when one unit is leveled for any particular depth of operation, the other unit is likewise leveled for the same depth of operation. In this modification, parts that are substantially the same as those described above are indicated by the same reference numerals. For example, it will be seen that the crank axles 51 are substantially the same as those described above. However, the bearing support of the beams 10 on the intermediate or journal portions 90 of the crank axles 51 is somewhat simplified as compared with Figure 4, for no individual leveling adjustment for the two units is necessary in this modification. Therefore, referring now to Figure 7, the crank axle is connected for rocking movement with the associated tool beam 10 by a pair of bearing plates 160 and 161, the former being substantially the same as the bearing plate 92 described above, being bolted to the outer face of the longitudinally extending bracket 68. The other bearing bracket 161 is not pivoted, as is the above described bracket 93, but is bolted directly to the tool beam 10 by a pair of bolts 162.

The stabilizing connection or coupling between the two plowing units in the modification shown in Figure 6 comprises a single U-shaped bracket or yoke 165, one arm 166 of which is apertured to receive the crank portions 131 and 132 of the crank axles 51. The outer or lower end of the arm 166 is held against lateral displacement in one direction relative to the crank axle by means of a collar 167 or the like. The other arm 168 of the bracket or yoke 165 is slotted, as at 169, so as to provide for a limited amount of angular movement between the two crank portions 131 and 132 of the crank axles 51 under the control of suitable adjusting mechanism. It will be understood that varying this angular relation serves to adjust both plow units so that the one that is in operation will be accordingly leveled.

The adjusting mechanism, indicated in its entirety by the reference numeral 175, comprises a lever 176 fixed, as by welding or the like, to a short sleeve 177 that is journaled on the crank portion 131 of the crank axle 51 and up against the upper end of the yoke arm 168. A collar 178 serves to hold the sleeve 177, and also the stabilizing bracket 165, against lateral displacement on the crank axle in the direction opposite to the direction in which the stabilizing coupling is held against displacement by the lower collar 167. The lever 176 is connected by means of a link 180 to the lower crank portion 132 of the crank axle 51 of the left hand plowing unit 5, and the link 180 is provided with a curved extension 181 which is notched so as to serve as a sector for detent mechanism 182 carried by the adjusting lever 176. The pivot connection between the link 180 and the adjusting lever is indicated at 183.

By swinging the adjusting lever 175 upwardly or downwardly, the left hand ends (Figure 8) of the crank axle portions 131 and 132 may be brought closer together or moved farther apart for the purpose of leveling the plow body of the unit in operation. This adjustment takes the place of the two crank screws in the form of the invention shown in Figure 1, for leveling one of the units also automatically levels the other since the plow is substantially symmetrical about a longitudinal center line. Thus, when the lever 175 is once set to correspond to the depth at which the plow is operated, it will not be necessary to change this adjustment until the plow is set to operate at an appreciably different plowing depth. In this connection it is to be noted that the stabilizing member 165, including the adjustable parts 175 and 180, serves as a pair of rigid links, the effective length of one of which is adjustable to vary the angle between the crank axles.

While I have shown and described above the preferred forms of the present invention, it is to be understood that my invention is not to be limited to the specific details shown and described above, but that, in fact, widely different means may be employed in the practice of the broader aspects of my invention.

What I claim, therefore, and desire to secure by Letters Patent is:

1. In an agricultural machine, a pair of separate units pivotally connected together at their forward ends and movable generally vertically relative to each other, ground engaging supporting means at one side of each unit, each unit with its supporting means being individually unstable, and means disposed rearwardly of the pivotal connection between the forward ends of said units for connecting said units together so as to accommodate said relative vertical movement but preventing relative swinging movement of either unit relative to the other about a generally longitudinal axis.

2. A two-way plow, comprising two unstable plowing units, each having a single ground engaging supporting means therefor, a common hitch to which said units are pivotally connected for generally vertical movement relative to one another, and a connection between said units rearwardly of said common hitch and having relatively vertically movable parts rigid against lateral angular displacement and connected respectively with said units for preventing said units from tilting laterally with respect to each other about the point of engagement between the supporting means of each unit on the ground meanwhile permitting said units to have relative vertical movement about the pivot axis of said hitch.

3. In a two-way plow, a pair of oppositely disposed unstable plowing units each having ground engaging supporting wheel means, hitch means to which said units are pivotally connected for generally vertical swinging movement about a common axis, a connection between said units rearwardly of said hitch means and accommodating said relative vertical movement and serving to cause each unit to be supported in part on the other unit, and means reacting against each supporting wheel means for raising the associated plowing unit relative thereto.

4. In a two-way plow, two separate oppositely disposed unstable units, said units being arranged side-by-side and each including a laterally outwardly disposed ground engaging supporting means, which means pivotally connected with the forward ends of said units and serving to prevent generally longitudinal movement of either unit with respect to the other while accommodating vertical movement of either unit relative to the other, a pivoted crank member extending inwardly from each of said units, and means serving as a laterally rigid connection between the laterally inner portions of said members accommodating the aforesaid relative vertical movement and arranged to support the laterally inner portion of each unit on the other.

5. In a two-way plow comprising two separate wheel-supported plowing units, a common hitch to which said units are connected for relative vertical movement and are prevented from shifting longitudinally of one another, and a fore and aft swinging hinge connection between said units for preventing said units from tilting laterally with respect to each other meanwhile permitting said units to have independent vertical movement.

6. In a two-way plow, two separate plowing units, each including a generally longitudinally extending tool beam and a laterally outwardly disposed ground engaging supporting means, means acting between each beam and the ground engaging supporting means associated therewith for raising and lowering the unit, and a fore and aft swinging stabilizing connection disposed laterally inwardly of said ground engaging supporting means and providing for relative vertical movement between said units and serving to support each, at least in part, on the other unit to prevent their lateral tilting about said ground engaging supporting means.

7. In a two-way plow, two separate wheel supported plowing units pivotally connected together at their forward ends against generally fore and aft shifting movement, a crank arm pivoted to each unit, each arm including a laterally inwardly extending swinging section, hitch means connected with the pivoted forward ends of said units to accommodate relative vertical movement of the latter about their pivoted ends, and a stabilizing member connected with the laterally inwardly disposed portions of said crank arms for fore and aft swinging and sewing to prevent lateral tilting of either unit with respect to the other while accommodating the above mentioned relative vertical movement.

8. In a two-way plow, two separate plowing units, each including a generally longitudinally extending tool beam, a crank axle journaled for rocking movement on the associated tool beam and having a laterally outwardly extending wheel receiving portion and a laterally inwardly extending crank portion, and means for swinging the crank axle for raising and lowering that unit independently of the other unit, and a stabilizing connection pivoted to said crank portions about generally parallel axes and accommodating relative vertical movement between said units while preventing lateral tilting of each unit with respect to the other.

9. A two-way plow comprising a pair of plowing units, each including a generally longitudinally extending tool beam, a crank axle journaled for rocking movement on said tool beam and including a generally forwardly disposed axle portion arranged alongside and laterally outwardly of the tool beam, a ground engaging supporting wheel journaled on said axle portion, and means reacting against the tool beam and said axle portion for raising and lowering the associated tool beam, hitch means connected with the forward ends of the tool beams of said two units and accommodating vertical movement of one unit relative to the other, and a stabilizing connection pivoted to the inner ends of the crank axles of said two units and operative to prevent each unit from tilting laterally relative to the other unit.

10. In a two-way plow, a pair of relatively movable plowing units, each including a longitudinally extending tool beam, a crank axle rockably mounted thereon, a ground engaging supporting wheel journaled on the laterally outwardly disposed axle portion of said crank axle, a power lift clutch associated with said wheel, and means connecting said clutch with said tool beam for raising and lowering the latter under the control of said clutch, a hitch connection for the front ends of said tool beams and accommodating the relative vertical movement of said units, and a stabilizing connection between said units and arranged to prevent said units from tilting laterally with respect to each other about the ground engaging supporting wheels while permitting vertical movement of either unit relative to the other under the control of the associated power lift clutch.

11. A two-way plow comprising two separate plowing units, each of said units including a tool beam, a crank axle rockably connected with said tool beam, a ground engaging supporting wheel journaled for rotation on said crank axle, a pair of laterally spaced brackets receiving said crank axle, and means for adjusting the position of one of said brackets for leveling the plowing unit, and a stabilizing connection between said plowing units providing for movement of one unit with respect to the other vertically but preventing lateral tilting of either unit about its ground engaging supporting wheel relative to the other unit.

12. A plowing unit comprising a tool beam, a crank axle having an axle portion, a ground engaging supporting wheel journaled on the axle portion of said crank axle, laterally spaced brackets connected with said tool beam and having apertured portions serving as journals receiving said crank axle, one of said brackets being pivotally connected at one end with said tool beam, and crank screw adjusting means at the other end of said adjustable bracket and serving to shift the position of said adjustable bracket relative to said tool beam.

13. A two-way plow comprising a pair of plowing units movable vertically with respect to each other, each of said units including a tool beam and a laterally outwardly disposed ground engaging supporting wheel, a hitch connection for the front ends of said beams and adjustably connected with the latter so as to provide for various spacing between said plowing units, and stabilizing means connected with said units and accommodating the relative vertical movement thereof but preventing said units from tilting laterally with respect to each other, said stabilizing connection including laterally adjustable parts to accommodate the lateral adjustment effected at said hitch connection.

14. A two-way plow comprising a pair of relatively movable plowing units, each having a laterally disposed ground engaging supporting wheel, a hitch connection for the forward ends of said units, including a member connected to the forward end of each unit for lateral adjustment relative thereto and a part connected to both of said members for transmitting draft thereto, and a laterally adjustable stabilizing connection between said units rearwardly of said hitch connection.

15. A tractor propelled two-way plow comprising a pair of unstable plowing units, each having its own supporting means and furrow opener, a laterally adjustable hitch connection adapted to be connected to the tractor drawbar and to receive draft therefrom and transmit the same to both of said units, said lateral adjustment providing for the disposition of said supporting means and said furrow opener so that the tractor wheel and supporting means can run in the same furrow and said furrow opener will be in a position to open the next furrow and a laterally rigid stabilizing connection between said units rearwardly of said hitch connection and including parts that are laterally adjustable to correspond to the adjustment of said hitch connection.

16. A two-way plow comprising two separate plowing units, each having a laterally inwardly extending member, a connection for said units comprising a part hingedly connected to each of said laterally inwardly extending members, and another part rigidly connected to each of said hinge parts, whereby lateral tilting of the units is prevented.

17. In a two-way plow, a pair of unstable separate wheel supported plowing units, a common hitch to which the units are connected for relative vertical movement, means serving as a hinged connection between said units to accommodate said relative vertical movement and to prevent said units from tilting laterally with respect to one another, and means for adjusting the angularity between the hinge axes to level the units.

18. In a two-way plow, two separate plowing units, each having a laterally outwardly disposed ground wheel, a common hitch to which said units are connected for relative vertical movement, a stabilizing connection between said units so as to prevent lateral tilting of either unit while accommodating said relative vertical movement, and means associated with said stabilizing connection for leveling the unit that is in operating position.

19. In a two-way plow, two separate wheel supported plowing units, a common hitch to which said units are connected for independent vertical movement, a laterally inwardly extending part carried by each of said units, means serving as a pair of laterally spaced link means pivoted to said laterally inwardly extending parts and arranged so that each unit serves to prevent lateral tilting of the other unit, and means for adjusting the effective length of at least one of said link means for leveling the operating position of both units.

20. A two-way plow comprising two separate plowing units, each having a tool beam carrying a furrow opener at the rear end thereof and a draft bar fixed for lateral adjustment to the forward end of the beam, and means supporting said beams and furrow openers for relative vertical movement.

21. A two-way plow comprising two separate plowing units, each consisting of a tool beam carrying a furrow opener at the rear end thereof and a draft bar fixed to the forward end of the beam for lateral adjustment relative thereto, hitch means pivotally connected to the forward ends of the draft bar for each unit, and supporting means for supporting said units and accommodating relative vertical movement of one with respect to the other about said hitch means.

22. A two-way plow comprising, in combination, two separate plowing units, each consisting of a generally longitudinally disposed tool beam, a crank axle journaled for rocking movement on said beam and having a laterally outwardly and downwardly disposed wheel carrying portion, and a ground engaging wheel journaled on said crank axle portion, hitch means pivoted to the forward ends of said beams and providing for pivotal movement in a generally vertical direction of one unit with respect to the other, the crank axle of each unit including a laterally inwardly disposed crank portion, and stabilizing means connecting the laterally inwardly crank portions of said crank axles.

23. A two-way plow comprising, in combination, two separate plowing units, each consisting of a generally longitudinally disposed tool beam, a crank axle journaled for rocking movement on said beam and having a laterally outwardly and downwardly disposed wheel carrying portion, and a ground engaging wheel journaled on said crank axle portion, hitch means pivoted to the forward ends of said beams and providing for pivotal movement in a generally vertical direction of one unit with respect to the other, the crank axle of each unit including a laterally inwardly disposed crank portion, stabilizing means connecting the laterally inwardly crank portions of said crank axles, an adjusting lever pivoted to each of said beams and operatively connected with the associated crank axle for swinging the latter to raise and lower the associated unit with respect to the other unit.

24. A two-way plow comprising two separate plowing units, each having a laterally inwardly extending member, and a connection for said units comprising two parts hinged, respectively, to the laterally inwardly extending members of said units and means connecting said parts together whereby lateral tilting of the units is prevented.

25. A two-way plow comprising two separate plowing units, each having a laterally outwardly disposed ground wheel, a common hitch to which said units are connected for relative vertical movement, a stabilizing connection between said units for preventing lateral tilting of either unit while accommodating said relative vertical movement, and means for adjusting the lateral angularity between each unit and said stabilizing connection so as to level the unit that is in operating position.

26. A two-way plow comprising two separate plowing units, each having a laterally outwardly disposed ground wheel, a common hitch to which said units are connected for relative vertical movement, a stabilizing connection between said units for preventing lateral tilting of either unit while accommodating said relative vertical movement, and means reacting against said stabilizing connection for adjusting the lateral angularity between said units so as to level the unit that is in operating position.

27. In an agricultural machine, a pair of separate units pivotally connected together at their forward ends and movable generally vertically relative to each other, ground engaging supporting means at one side of each unit, a member pivotally connected to each of said units, and fore and aft swinging means hingedly connecting said members together so as to accommodate said relative vertical movement and to support one side of each unit on the other unit.

28. In a frameless two-way plow, two separate plowing units, each having a ground engaging supporting means therefor, a common hitch to which said units are pivotally connected for generally vertical movement relative to one another, a crank arm pivotally connected to each of said units, and a connection between said arms for preventing said units from tilting laterally with respect to each other meanwhile permitting said units to have relative vertical movement about the pivot axis of said hitch.

29. In a frameless two-way plow, a pair of oppositely disposed unstable plowing units, hitch means to which said units are pivotally connected for generally vertical swinging movement about a common axis, and a connection between said units including a member pivotally connected to each of said units, and means pivotally connecting said members together whereby to accommodate said relative vertical movement and serving to cause each unit to be supported in part on the other unit.

30. A two-way plow having a pair of oppositely disposed unstable plowing units, means pivotally connecting the forward portions of said units for generally vertical swinging movement, a crank axle for each unit having inner and outer parts and an intermediate section disposed longitudinally of the associated parts, a ground wheel journaled on the outer part of each crank axle, journal means supporting said units on the intermediate sections of said crank axles, and laterally rigid hinge means connecting the inner parts of said crank axles.

31. A two-way plow as defined in claim 30, wherein each unit is provided with raising and lowering means acting against the associated crank axle, said laterally rigid hinge means accommodating swinging movement of either crank axle relative to the other.

32. An agricultural machine comprising a pair of units, ground engaging supporting means for each unit, means connecting said units together for relative vertical movement, and mechanism spaced from said first connecting means and connected to each unit to prevent either unit from tilting laterally about its supporting means relative to the other unit while accommodating said relative vertical movement.

33. A two-way plow comprising a pair of relatively vertically movable units, a ground wheel for each unit disposed so that each unit is individually unstable, hitch means connected to both of said units and accommodating said relative vertical movement, a crank axle for each unit, each crank axle having a crank portion, an axle portion, and a section journaled in laterally rigid relation on the associated unit, one of said crank axle portions of each crank axle receiving the associated ground wheel, and a laterally rigid stabilizing connection disposed rearwardly of said hitch means and connected to the other portion of each crank axle for causing each unit to be supported in part on the other unit, one of said portions of each crank axle being disposed at an angle to the other portion of that crank axle so that swinging movement of each crank axle to lower the associated unit into operating position automatically levels the unit.

JULIUS PETERSON.

CERTIFICATE OF CORRECTION.

Patent No. 2,168,882. August 8, 1939.

JULIUS PETERSON.

It is hereby certified that error appears in the printed specification of the above numbered patent requiring correction as follows: Page 4, second column, line 45, claim 7, for the word "sewing" read serving; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.